United States Patent Office 3,409,601
Patented Nov. 5, 1968

3,409,601
PROCESS AND CATALYTIC COMPOSITION FOR THE SOLUTION POLYMERIZATION OF VINYLICALLY UNSATURATED MONOMERS
Giancarlo Borsini, Milan, Carlo Nicora, Varese, and Angelo Segalini, Novara, Italy, assignors to Montecatini Edison, S.p.A., Milan, Italy
No Drawing. Filed July 29, 1964, Ser. No. 386,061
Claims priority, application Italy, July 31, 1963, 15,964/63
22 Claims. (Cl. 260—87.5)

ABSTRACT OF THE DISCLOSURE

A process for polymerizing vinyl halides, vinyl acetate, acrylates, acrylonitriles, and acrylic acids in solution in a polar solvent at a temperature between −100° C. and +40° C. wherein the catalyst composition consists essentially of an organo-metallic derivative having the general formula: $MeR_4$, wherein R is an alkyl, aryl, cycloalkyl or aralkyl radical, and Me is an element from Group IV(A) of the Periodic Table; a cupric salt (e.g. cupric acetate, cupric formate, cupric chlorate, cupric perchlorate, cupric nitrate or cupric sulfate; and a cuprous complexer (e.g. organic phosphorus-acid esters or organic nitriles).

---

The present invention relates to the polymerization of vinylically unsaturated monomers and, more particularly, to an improved process and composition for the solution polymerization of such monomers.

For the purposes of the present disclosure, the term "vinylically unsaturated" will be used to designate monomeric compounds capable of polymerization and characterized by an ethylenic unsaturation (double bond). Such compounds can be characterized by the structural formula

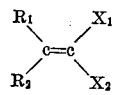

wherein $R_1$ and $R_2$ can be hydrogen or the identical or different organic and nitrile radicals while $X_1$ and $X_2$ are usually hydrogen or halogen atoms; generally, however, either $R_1$ and $R_2$ or $X_1$ and $X_2$ will both be hydrogen. Such compounds include those characterized as vinylic compounds as well as the vinylidenes. As exemplary of the broad classes of compounds with which the present invention is concerned, the following monomer types may be listed: vinyls (e.g. vinyl halides and vinyl carboxylates), acrylates (e.g. methylmethacrylate), acrylic acids, acrylonitriles (e.g. unsubstituted acrylonitrile and methacrylonitrile), and the like.

Unsaturated compounds of these types have been polymerized hitherto with the aid of catalytic systems usually containing a tetraalkyl derivative of lead and a metallic salt, the polymerization reaction being carried out at room temperature or higher. It has also been proposed to polymerize vinylic monomers, such as vinyl chloride, with the aid of a catalyst system including, as a reaction initiator, a copper salt or another salt of an element of Group I(B) of the Periodic System or table in combination with an organo-metallic compound wherein the metal is chosen from Groups I–III of the Periodic System. A catalytic system of this nature is difficult to work with because of the problems involved in the handling of alkyl derivatives of metals from Groups I–III of the Periodic System. For the purposes of the present disclosure, the Periodic System or table will be that basically attributed to Mendelyeev, in the long-form modification. A Periodic Table of this type can be found in the Handbook of Chemistry and Physics, 41st edition (Chemical Rubber Publishing Company, Cleveland, Ohio), pp. 448 and 449.

It has long been desired to produce high polymers from vinylically unsaturated monomers, of the type mentioned above, with a high degree of steric regularity, and polymers having a high stereo-regular structure have been formed as a result of investigations into this matter although polymerization processes of this type generally must operate at very low temperatures. The catalytic systems mentioned above, however, when used at such low temperatures, result in polymerization and reaction rates so slow as to render the processes industrially uneconomical and unsatisfactory.

It is, therefore, a principal object of the present invention to provide an industrially applicable process for polymerizing vinylically unsatturated monomers to polymers having high steric regularity and capable of operating economically even at low temperatures.

A concomitant object of this invention is to provide a process for polymerizing monomeric systems of the character described at relatively low temperatures but at improved reaction rates into particularly satisfactory polymeric materials whose mechanical and thermal properties render them suitable for films and fibers of very good quality.

Still another object of this invention is to provide a process of the character described making use of an improved catalytic system free from the handling disadvantages (e.g. inflammability and explodability) characterizing earlier catalyst systems.

A further object of our invention is to provide an improved catalytic system capable of obviating the aforedescribed disadvantages.

Yet another object of our invention is to provide a polymeric material of high steric regularity and mechanical and thermal properties rendering it suitable for use in fibers and films of very good quality.

These objects and others which may become apparent hereinafter are attained, in accordance with the present invention, by a process which involves the solution polymerization of vinylically unsaturated monomeric systems of the character described, at relatively low temperatures (particularly between −100° C. and +40° C.) and in the presence of a unique three-components catalyst composition consisting essentially of:

A first component constituted by at least one organometallic derivative of an element from Group IV(A) of the Periodic Table—the element being selected preferably from the group consisting of germanium, tin and lead;

A second component constituted by at least one cupric salt; and

A third component constituted by at least one organic compound containing an element from Group V(A) of the Periodic Table (i.e. selected from the group consisting of nitrogen, phosphorus, arsenic, antimony and bismuth). The organic compound of the third component should, as will be described in further detail hereinbelow, be capable of forming complexes with the second component in the form of cuprous ion.

It is believed that the third component of the catalytic composition performs the function of complexing and coordinating the cuprous ions formed by reduction of the cupric salt by means of the organometallic derivative according to reaction scheme that we suppose as follows:

$$Cu^{++} + Me^{IV}R_4 \rightarrow Cu^+ + Me^{IV}R_3^+ + R\cdot$$

In such a way the cuprous ions should be disengaged from the reaction system, in form of a complex with the third component. The rate of radicals (R·) formation and hence the rate of polymerization itself should be greatly increased by the disengagement from the reaction system of one of the reaction products, precisely constituted of the cuprous ion.

We have found, more particularly, that this third component should most advantageously be an organic compound containing nitrogen or phosphorus. A preferred group of these compounds comprises the organic nitriles and the organic esters of phosphorous acid characterized by the structural formula:

$$P\begin{matrix}OR_1\\OR_2\\OR_3\end{matrix}$$

wherein $R_1$, $R_2$, $R_3$ are identical or different organic radicals (e.g. alkyl, aryl, cycloalkyl or aralkyl hydrocarbon radicals).

The first component of the catalyst system, namely the organo-metallic derivative of a Group IV(A) element, preferably is of the type characterizable as a tetraorgano compound of the tetravalent central element. Such compounds have the general formula $Me^{IV}R_4$, wherein IV is the valence and $Me^{IV}$ is an element with this valence and can be germanium, tin or lead; R is an organic hydrocarbon radical from the group consisting of alkyl, aryl, cycloalkyl and aralkyl radicals. Best results are achieved when the compound contains alkyl groups with low carbon number—such as methyl or ethyl groups—and the metal is lead; tetramethyl lead and tetraethyl lead thus yield optimum catalytic effects in the recited combination.

The second component of the catalyst system consists, as indicated above, of one or more cupric salts, this designation being used for cupric compositions only in the broadest sense characterizable as salts as well as those compounds having true ionic bonds between an electronegative atom or anion and the cupric ion. Compounds of this type include cupric salts of lower organic acids (e.g. formic and acetic acids) or cupric salts or inorganic acids, preferably those having oxygen-containing anions (e.g. cupric chlorate, cupric perchlorate, cupric nitrate and cupric sulfate). Particularly suitable are cupric perchlorate and the cupric nitrates $$Cu(NO_3)_2 \cdot 3H_2O$$

and $$Cu(NO_3)_2 \cdot 6H_2O$$

Thus it has been found that monomeric systems of the type described above can effectively be polymerized in the presence of a catalyst composition constituted by a tetraalkyl derivative of lead, a cupric salt, and a third component such as a dinitrile of a carboxylic acid at unusually fast polymerization rates even at low temperatures and, in any event, at rates much higher than could be obtained heretofore under similar conditions with the aid of a catalyst composition omitting the third component. The monomers which can be polymerized with ease by the process described above are the vinyl chlorides, the vinylidene chlorides, vinyl acetates, methyl methacrylates, unsubstituted acrylonitriles, methacrylonitriles, acrylic acids and the like.

It has been discovered that most effective polymerization results from the use of polar organic solvents as the reaction medium, the solvent being present in such proportion to at least the monomer system and preferably also the catalyst composition that the reaction medium is substantially completely homogeneous at the initiation of the reaction. Suitable polar solvents are the oxygen-containing organic compounds such as the lower aliphatic alcohols and the ethers. Methanol and tetrahydrofuran are examples of solvents particularly suitable for the conduct of the process. The latter can be carried out in conventional apparatus, preferably under an inert atmosphere. The operating temperatures range between −100° C. and +40° C. and atmospheric pressure or a somewhat higher pressure due to the vapor pressure of the monomeric system at the operating temperature may be used. Throughout, it should be considered that the term "monomeric system" is used to define a single monomer to be subjected to homopolymerization as well as a mixture of compatible monomers adapted to be copolymerized, the catalyst composition being equally suitable for such homopolymerization and copolymerization.

As indicated above, a particularly suitable constituent for the third component of the catalyst system, are the organic nitriles and compounds containing at least one cyano (CN) group. These latter compounds include nitriles of aliphatic and aromatic monocarboxylic acids (e.g. acetic, propionic, butyric, phenylacetic, benzoic, orthotoluic, metatoluic and paratoluic acids); mono- or dinitriles of aliphatic dicarboxylic acids (e.g. malonic, succinic, glutaric, adipic, pimelic, suberic, azelaic, maleic and malic acids); mono- and dinitriles of dicarboxylic acids of the cycloalkane (e.g. cyclohexane) series; and mono- and dinitriles of aromatic dicarboxylic acids (e.g. orthophthalic acid) and aralkyl acids having the general formula

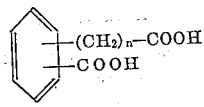

where $n$ is an integer ranging from 1–5, inclusive.

The relative proportions of the three components of the catalyst composition are effective within fairly wide ranges although certain preferred proportions should be maintained for most satisfactory use of the catalyst and the components thereof. For example, the most effective molar ratio of the cupric compound (second component) to the organo-metallic derivative (first component) is between substantially 0.1 and 2. Similarly, the molar ratio of the cupric compound to the complexing and co-ordinating agent (third component) should be within the range of 0.05 to 5 while most satisfactory results are obtained when the catalyst is present in such an amount, in terms of the cupric compounds, that it constitutes from 0.1 to 3% by weight of the monomeric system. Preferably, however, the molar ratio of the second component to the first component is substantially between 0.3 and 1 while the molar ratio of the second component to the third component is between substantially 0.1 and 0.5.

We have found that the reaction can be carried out with greatest success when the monomeric system to be polymerized is first introduced into a polymerization autoclave from which air has been excluded by displacement with nitrogen. The catalyst composition is then supplied to the autoclave by successively adding the first component, the second component dissolved in the organic solvent, and then the third component as mentioned above. The autoclave and its contents are maintained for a predetermined period at the polymerization temperature which will vary from −60° C. to 0° C. when the vinyl chloride constitutes a component of the monomeric system. The components of the autoclave can then be discharged and the homopolymer or copolymer thus produced separated from the residue primarily consisting of components of the catalyst. It has been found that the resulting polymer has a high stereoregularity and, particularly when it constitutes a polyvinyl chloride, has excellent chemical and physical characteristics which permit its utilization for fibers and films of very good quality. In the case of polyvinyl chlorides the polymers resulting from the process described above have relatively high molecular weights ranging between substantially 60,000 and 150,000.

The invention will be further described with reference to some specific examples provided merely as illustrative of the invention and not considered to be limiting of its scope.

Example I

In a small glass vessel at −78° C., under a nitrogen atmosphere, 15 gr. of vinyl chloride, previously dried on anhydrous calcium chloride, were condensed. Under a nitrogen stream, in succession, 0.46 gr. of tetraethyllead, 0.36 gr. of Cu(NO$_3$)$_2$·3H$_2$O and 0.475 gr. of succinic dinitrile were charged into the vessel.

The small vessel was then placed in a thermostatic bath at −15° C. and maintained under constant stirring for a period of 5 hrs. and 30 minutes. Then the vessel was opened, its contents filtered and washed with methanol acidified with dilute nitric acid until the lead completely disappeared. This washing was followed by another with pure methanol until the polymer no longer gave an acidic reaction. The amount of polymer thus obtained, after drying at 50° C. under vacuum, was 4.6 gr. with a monomeric conversion of 30.7%. The intrinsic viscosity of the polymer solution was 1.65 dl./gr. corresponding to an average molecular weight of 95,000.

The polymer molecular weight, in the case of polyvinylchloride, is determined by measurements of intrinsic viscosity at 25° C. for polymer solutions in cyclohexanone with a polymer content of 1% by weight.

The relation between the polymer molecular weight and the intrinsic viscosity is the following:

$$\eta = 2.4 \times 10^{-4} (\overline{Mn})^{0.77}$$

wherein $\eta$ = the intrinsic viscosity of the polymer solution
$Mn$ = the numeric average molecular weight.

Upon I.R. spectrographic analysis of the polymer, a ratio I.S. between the absorption bands at 635 cm.$^{-1}$ and 692 cm.$^{-1}$ of 2.2 was obtained. This ratio is generally called the "syndiotassis index."

In fact the polyvinylchloride stereoregularity is determined on the basis of measurements of the polymer I.R. spectrum, because in the I.R. polyvinylchloride spectrum, the stereoregular grade of the macromolecular chain produces its strongest effects in the field from 600 to 700 cm.$^{-1}$, wherein there are two particularly significant bands at 635 and 692 cm.$^{-1}$. The former relates to the syndiotactic configuration and the latter to the isotactic or atactic configuration.

For these reasons, the ratio $I(635)/I(692)$, where I is the intensity of the bands, will be indicated as "IS" and can be assumed to be a measurement of the relative amount of the polymer syndiotactic fraction.

The experimental measurements are conducted by dissolving the polymer in cyclohexanone at about 120° C. for 15 minutes; a solution containing from 0.8 to 1% by weight of polymer is so obtained. The solution is quickly cooled and evaporated at 50° C. under vacuum (10 mm. Hg) on a glass plane surface.

Films with a 20–30 micron thickness are obtained suitable for I.R. analysis carried out by a spectrophotometer (Perkin-Elmer 21, with a double radius and a KBr prism).

By working under the same conditions, with a catalytic system only formed by the cupric compound and by tetraethyllead only 0.5 gr. of polymer were obtained with a conversion of 3.3%, practically a tenth of what was obtained with the catalytic composition of this invention.

Example II

In a small glass vessel at −78° C., under a nitrogen atmosphere, 15 gr. of vinyl chloride, previously dried on anhydrous calcium chloride, were condensed. Under a nitrogen stream, in succession, 0.46 cc. of tetraethyllead and 0.36 gr. of Cu(NO$_3$)$_2$·3H$_2$O and 0.475 gr. of succinic dinitrile, both dissolved in methanol, were introduced. The vessel was placed in a thermostatic bath at −30° C. and kept under constant stirring for 5 hrs. and 30 minutes. Then by following Example I, 1.0 gr. of polymer was obtained with a monomeric conversion of 6.6%.

The intrinsic viscosity, determined as hereinabove described, was 1.9 dl./gr. corresponding to an average molecular weight of 115,000. After I.R. spectrographic analysis a ratio IS between the intensities of absorption bands at 635 and 692 cm.$^{-1}$, of 2.3 was obtained.

By working under the same conditions with a catalytic system only formed by the cupric compound and by tetraethyllead, only traces of polymer were obtained.

Example III

In a small glass vessel at −78° C. under nitrogen atmosphere, 15 gr. of vinyl chloride previously dried on anhydrous calcium chloride, were condensed. Under a nitrogen stream, in succession, 0.46 cc. of tetraethyllead, 0.29 gr. of Cu(NO$_3$)$_2$·3H$_2$O dissolved in methanol and 0.63 cc. of acetic nitrile (CH$_3$CN) were introduced. The vessel was then placed in a thermostatic bath at −15° C. and kept under constant stirring for 5 hrs. and 30 minutes. By operating as in the previous example, 1.5 gr. of polymer were obtained with a monomeric conversion of 10%. The intrinsic viscosity determined as hereinabove mentioned was 1.25 dl./gr. corresponding to an average molecular numeric weight of 68,000. Upon a spectrographic I.R. analysis, a ratio I.S. of 2.2 was obtained.

Example IV

By working under the same conditions as in Example III, a small glass vessel was prepared by employing 0.34 gr. of glutaric dinitrile instead of 0.63 cc. of acetonitrile. The vessel was put into a thermostatic bath at −15° C. and kept under constant stirring for 4 hrs. At this point the small vessel was opened and, under the same conditions as in preceding examples, 4 gr. of polymer were obtained with a monomeric conversion of 26.6%.

The intrinsic viscosity, determined as hereinabove mentioned was 1.7 dl./gr. corresponding to a numeric average molecular weight of 100,000. Upon spectrographic I.R. analysis, a ratio I.S. of 2.2 was obtained.

Example V

In a 250 cc. polymerization autoclave, the air was entirely replaced by a nitrogen atmosphere. Thereafter at −78° C. 100 gr. of vinyl chloride, previously dried on anhydrous CaCl$_2$, were condensed into the autoclave. Then, in succession and still under a nitrogen stream, 3.0 cc. of tetraethyllead, 1.9 gr. of Cu(NO$_3$)$_2$·3H$_2$O dissolved in methanol, and 7.0 cc. of benzonitrile were introduced. The temperature within the autoclave was kept at −5° C. for 2 hrs. and 30 minutes and during this time the contents of the autoclave was kept under continuous stirring. After this period, stirring was terminated, the contents of the autoclave filtered, washed with methanol acidified with nitric acid to disappearance of tetraethyllead and again washed with pure methanol to disappearance of the acid reaction. The amounts of polymers thus obtained, after drying under vacuum at 50° C., was 18 gr. with a monomeric conversion of 18%.

Example VI

By operating under the same conditions as in the preceding example, employing 4 gr. of phthalic dinitrile instead of benzonitrile, the former dissolved in methanol, 37 gr. of polymer were obtained after two hrs. of polymerization at −5° C.

Example VII

By operating under the same conditions as in Example III, employing 0.15 cc. of triphenyl phosphite

[(P(OC$_6$H$_5$)$_3$]

instead of 0.63 cc. of acetonitrile, after 5 hrs. and 30 minutes of polymerization at −15° C., 1.5 gr. of dried polymer were obtained with a monomeric conversion of about 10%.

The intrinsic viscosity $\eta$, determined as hereinabove mentioned was 1.3 dl./gr., corresponding to a numeric average molecular weight of 70,000. After a I.R. spectographic analysis, a ratio I.S. of 2.2 between the intensities of the absorption bands at 635 and 692 cm.$^{-1}$ was obtained.

Example VIII

In a small vessel under a nitrogen atmosphere, at −78° C., 15 gr. of vinyl chloride were condensed. Still under a nitrogen atmosphere and in succession, 0.16 cc. of tetramethyllead, 0.36 gr. of Cu(NO₃)₂·3H₂O and 0.24 gr. of succinic dinitrile solved in methanol were supplied to the vessel. The vessel was hermetically sealed and placed in a thermostatic bath at −60° C.

The vessel was kept at this temperature under stirring for 6 hrs. By operating under the same recovery conditions of the preceding examples, 0.44 gr. of dried polymer were obtained with a monomeric conversion of 2.9%. The intrinsic viscosity was 2.3 dl./gr. corresponding to a numeric average molecular weight of about 150,000 and the ratio I.S. was 2.7.

Example IX

In a small polymerization autoclave under a nitrogen atmosphere, 100 gr. of vinyl chloride previously dried on anhydrous calcium chloride were condensed at −78° C. Still under a nitrogen atmosphere and in succession, 2.06 gr. of tetramethyllead 2.06 gr. of Cu(NO₃)₂·3H₂O and 1.7 gr. of succinic dinitrile respectively solved in 8 and 5 cc. of methanol were added. The whole was stirred for 4 hrs. at a temperature of −40° C.

By operating with the same recovery conditions of the preceding example, 11 gr. of dried polymer were obtained.

The intrinsic viscosity was 1.9 corresponding to a numeric average molecular weight of 115,000 and the ratio I.S. was 2.4.

Example X

By following the procedure described in Example IX, 100 g. of vinyl chloride (dried on CaCl₂), 1.8 g. of tetramethyllead and then 1.7 g. of Cu(NO₃)₂·3H₂O and 1.4 g. of malonic dinitrile, respectively dissolved in 8 and 3 cc. of methanol, were introduced into the small autoclave.

The contents of autoclave were kept under stirring for 4 hrs. at −40° C. and by working under the same conditions of the preceding examples 9 g. of dried polymer were thus obtained.

The intrinsic viscosity of cyclohexanone solution was 1.7 dl./g. corresponding to a numeric average molecular weight of 100,000.

The same polymer was characterized by a IS ratio of 2.35.

Example XI

By following the procedure described in Example IX, for 100 g. of vinyl chloride (dried on CaCl₂) 3 g. of Cu(ClO₄)₂·6H₂O dissolved in 12 cc. of methanol were used instead of 1.7 g. of Cu(NO₃)₂·3H₂O.

8.5 g. of dried polymer with an intrinsic viscosity of 1.8 dl./g. (corresponding to a numeric average molecular weight of 107,000) and a ratio IS of 2.4 were obtained.

Example XII 10 cc. of just distilled methylmethacrylate were introduced in a 30 cc. small glass vessel.

0.11 g. of Cu(NO₃)₂·3H₂O, dissolved in 0.66 cc. of methanol, 0.09 g. of succinic dinitrile dissolved in 0.25 cc. of methanol and 0.07 cc. of tetramethyllead were there introduced.

The small vessel was put into a thermostatic bath at −30° C. and kept under constant stirring for two hours.

The so obtained polymer was precipitated by pouring the contents of the small glass vessel into 50 cc. of methanol.

The whole was filtered, and then dried under vacuum at 50° C.

The amount of the obtained polymer was 5.3 g.

Its molecular weight determined by viscosimetric measurements was 53,000. The relation between the intrinsic viscosity of the cyclohexanone polymer solution and the polymer molecular weight is the following $$[\eta] = 5.12 \cdot 10^{-5} \overline{M}n^{0.76}$$

wherein $\overline{M}n$ is the average molecular weight and $[\eta]$ is the intrinsic viscosity of the polymer solution.

By working under the same conditions with a two components (Cu(NO₃)₂·3H₂O—Pb(CH₃)₄) catalytic system only traces of polymer were obtained.

What is claimed is:

1. A process for producing a polymer, comprising the step of polymerizing a monomeric system consisting essentially of at least one vinylically unsaturated compound selected from the group consisting of vinyl halides, vinyl acetate, acrylates, acrylonitriles, and acrylic acids in solution in a polar solvent at a temperature ranging between substantially −100° C. and +40° C. in the presence of a catalyst composition consisting essentially of:
   a first component consisting of an organo-metallic derivative having the general formula: MeR₄, wherein R is a hydrocarbon radical selected from the group consisting of alkyl, aryl, cycloalkyl and aralkyl radicals, and Me is an element from Group IV (A) of the Periodic Table;
   a second component consisting of a cupric salt selected from the group consisting of a cupric acetate, cupric formate, cupric chlorate, cupric perchlorate, cupric nitrate and cupric sulfate; and
   a third component consist of an organic compound capable of forming complexes with cuprous ions and selected from the group consisting of organic esters of acids of phosphorus and organic nitriles.

2. A process for producing a polymer, comprising the step of polymerizing a monomeric system consisting essentially of at least one vinylically unsaturated compound selected from the group consisting of vinyl halides, vinyl acetates, acrylates, acrylonitriles, and acrylic acids in solution in an oxygen-containing organic polar solvent at a temperature ranging between substantially −100° C. and +40° C. in the presence of a catalyst composition consisting essentially of:
   a first component consisting of an organo-metallic derivative having the general formula: MeR₄, where R is a hydrocarbon radical selected from the group consisting of alkyl, aryl, cycloalkyl and aralkyl radicals, and Me is an element from Group IV (A) of the Periodic Table;
   a second component consisting of a cupric salt selected from the group consisting of a cupric acetate, cupric formate, cupric chlorate, cupric perchlorate, cupric nitrate and cupric sulfate; and
   a third component consisting of an organic compound capable of forming complexes with cuprous ions and selected from the group consisting of organic esters of acids of phosphorus and organic nitriles.

3. The process defined in claim 2 wherein said solvent is selected from the group consisting of lower aliphatic alcohols and the ethers and is present relative to said monomeric system in an amount at least sufficient to produce a substantially homogeneous solution at the commencement of the polymerization reaction.

4. The process defined in claim 2 wherein said monomeric system includes a vinyl chloride.

5. The process defined in claim 2 wherein said monomeric system includes a methylmethacrylate.

6. The process defined in claim 2 wherein said monomeric system further comprises at least one additional vinylically unsaturated compound copolymerizable with said vinyl chloride.

7. The process defined in claim 2 wherein the molar ratio of said second component to said first component ranges between substantially 0.1 and 2, the molar ratio of said second component to said third component ranges between substantially 0.05 and 5, and said second component is present in an amount ranging between substantially 0.1 to 3% by weight of said monomeric system.

8. The process defined in claim 7 wherein the molar ratio of said second component to said first component ranges between 0.3 and 1, and the molar ratio of said second component to said third component ranges between 0.1 and 0.5.

9. The process defined in claim 2 wherein said element of said first component is selected from the group of germanium, tin and lead.

10. The process defined in claim 9 wherein said first component is tetramethyllead.

11. The process defined in claim 9 wherein said first component is tetraethyllead.

12. The process defined in claim 2 wherein said second component is cupric nitrate $(Cu(NO_3)_2 \cdot 3H_2O)$ or $Cu(NO_3)_2 \cdot 6H_2O$.

13. The process defined in claim 2 wherein said second component is cupric perchlorate $(Cu(ClO_4)_2 \cdot 6H_2O)$.

14. The process defined in claim 2 wherein said third component has the general formula:

where $R^1$, $R^2$ and $R^3$ are each selected from the group consisting of alkyl, aryl, cycloalkyl and aralkyl hydrocarbon radicals.

15. The process defined in claim 14 wherein said third component is triphenyl phosphite.

16. The process defined in claim 2 wherein said organic nitriles are nitriles of aliphatic and aromatic monocarboxylic acids, mono- and dinitriles of aliphatic and aromatic dicarboxylic acids, mono- and dinitriles of dibasic cyclohexane carboxylic acids, and mono- and dinitriles of aralkyl dicarboxylic acids having the general formula:

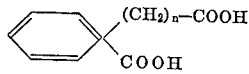

where $n$ is an integer ranging from 1 to 5, inclusive.

17. The process defined in claim 16 wherein said organic nitriles are selected from the group comprising malonic dinitrile, succinic dinitrile, acetic nitrile, glutaric dinitrile benzonitrile and phthalic dinitrile.

18. A process for producing a polymer, comprising the step of polymerizing vinyl chloride in solution in a polar solvent at a temperature ranging between substantially −60° C. and 0° C. in the presence of a catalyst composition consisting of a tetraalkyllead, a cupric salt and an organic compound containing at least one nitrile group and capable of forming complexes with cuprous ions.

19. A process for producing a polymer, comprising the step of polymerizing methylmethacrylate in solution in a polar solvent at a temperature ranging between substantially −60° C. and 0° C. in the presence of a catalyst composition consisting of a tetraalkyllead, a cupric salt and an organic compound containing at least one nitrile group and capable of forming complexes with cuprous ions.

20. A catalyst composition for the polymerization of vinylically unsaturated componuds, consisting essentially of:

a first component consisting of an organo-metallic derivative having the general formula: $MeR_4$, where R is a hydrocarbon radical selected from the group consisting of alkyl, aryl, cycloalkyl and aralkyl radicals, and Me is an element from Group IV (A) of the Periodic Table;

a second component consisting of a cupric salt selected from the group consisting of a cupric acetate, cupric formate, cupric chlorate, cupric perchlorate, cupric nitrate and cupric sulfate; and a third component consisting of an organic compound capable of forming complexes with cuprous ions and selected from the group consisting of organic esters of acids of phosphorus and organic nitriles.

21. The catalyst composition defined in claim 20 wherein the molar ratio of said second component to the said first component ranges between substantially 0.1 and 2, and the molar ratio of said second component to said third component ranges between substantially 0.05 and 5.

22. The catalyst composition defined in claim 20 wherein the molar ratio of said second component to said first component ranges between 0.3 and 1, and the molar ratio of said second component to said third component ranges between 0.1 and 0.5.

References Cited

Bawn, C. E. H. and Whitby, F. J.: The Formation and Reactions of Free Radicals in Solution at Low Temperature. In Discussions of the Faraday Society, No. 1–2, pp. 233–36, 1947 TK 1F2 5D.

JOSEPH L. SCHOFER, Primary Examiner.

J. A. DONAHUE, Assistant Examiner.